W. A. SCHROEDER.
CONTROLLABLE HEADLIGHT SCREEN.
APPLICATION FILED DEC. 27, 1917.
1,305,498.
Patented June 3, 1919.
4 SHEETS—SHEET 2.
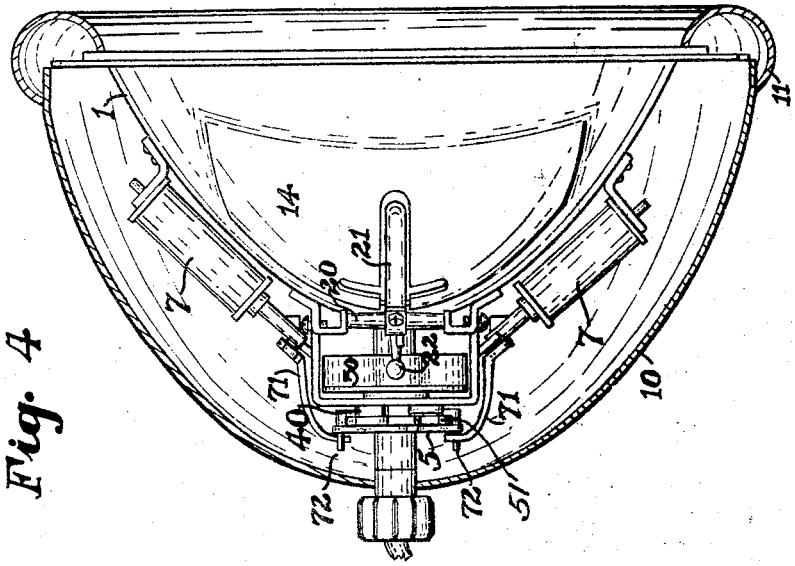
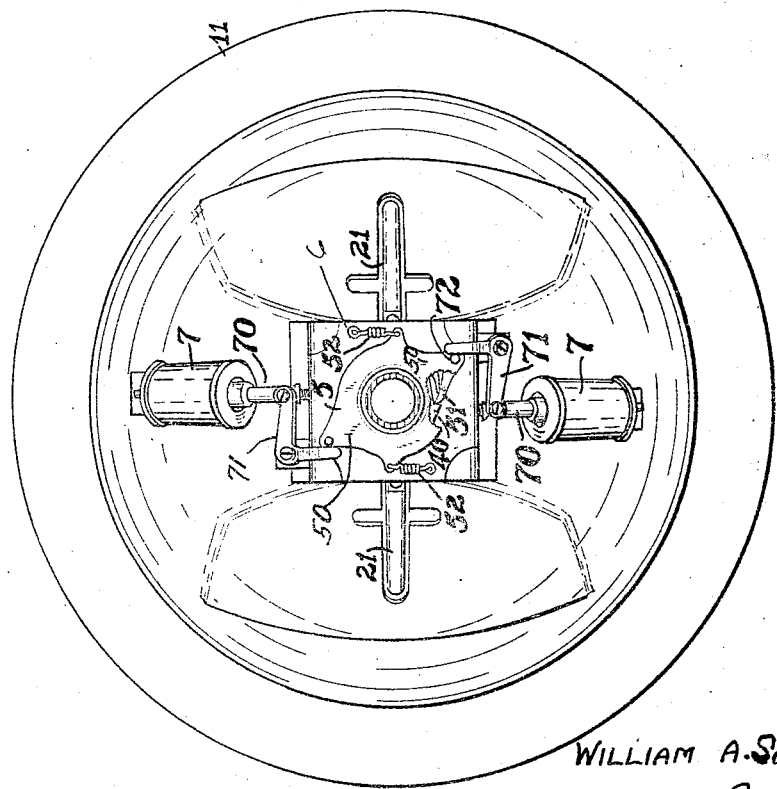
Inventor
WILLIAM A. SCHROEDER
By Henry L. Reynolds
Attorney Inventor
WILLIAM A. SCHROEDER By Henry L. Reynolds
Attorney

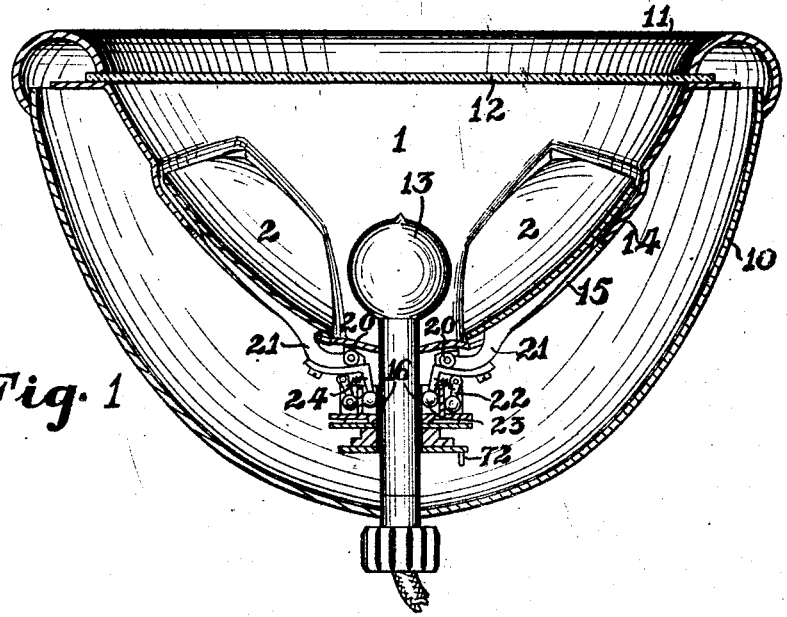
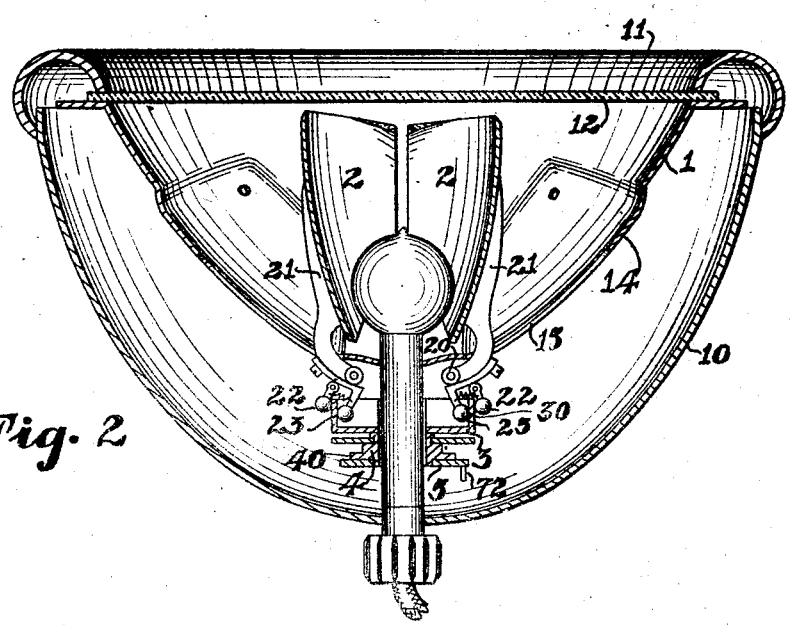

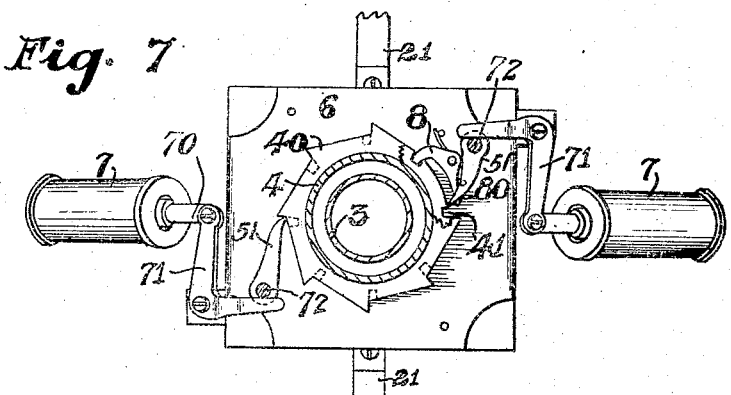
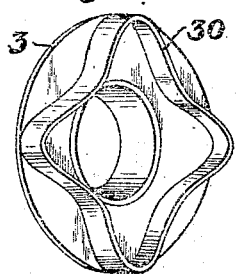
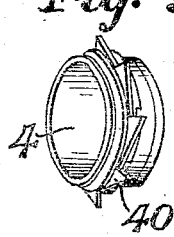
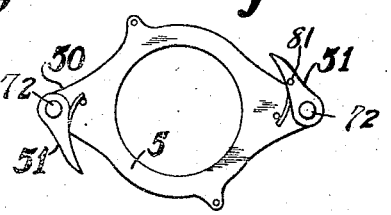
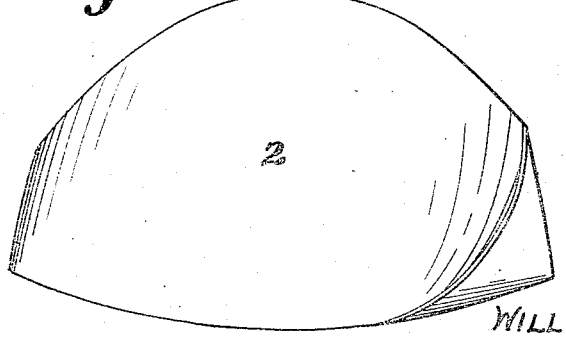
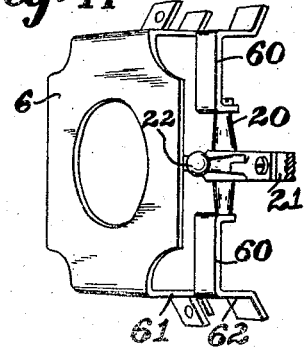

UNITED STATES PATENT OFFICE.

WILLIAM A. SCHROEDER, OF SEATTLE, WASHINGTON.

CONTROLLABLE HEADLIGHT-SCREEN.

1,305,498.    Specification of Letters Patent.    Patented June 3, 1919.

Application filed December 27, 1917. Serial No. 209,030.

*To all whom it may concern:*

Be it known that I, WILLIAM A. SCHROEDER, a citizen of the United States, and resident of the city of Seattle, county of King, and State of Washington, have invented certain new and useful Improvements in Controllable Headlight-Screens, of which the following is a specification.

My invention relates to headlights such as are employed on automobiles and consists of a screening or shielding device which may be used to prevent the light from shining over as wide an area as it would ordinarily occupy and thus prevent the glare extending to the point where it might be dangerous to parties coming toward the automobile from the front.

The object of my invention is thus to contract the area of the beam of light and in a measure cut off a portion thereof and prevent its spreading too far.

My invention comprises the novel parts and combinations thereof which will be hereinafter described and then particularly pointed out in the claims.

In the accompanying drawings I have shown my invention in the form of construction which is now most preferred by me.

Figure 1 is a horizontal section or plane through the center of the headlight and my device as applied thereto, the screen members being shown in their opened position.

Fig. 2 is a similar section but showing the screen members in closed position.

Fig. 3 is a rear elevation of the device with the outer casing removed to thus show the working parts.

Fig. 4 is a vertical section through the outer casing showing the reflector proper and the screen operating mechanisms in elevation.

Fig. 7 is a rear view of the parts by which the rotation of the screen is secured.

Fig. 8 is a perspective of the rotative disk upon which the cam flange is secured.

Fig. 9 shows in perspective the ratchet mechanism which is secured to the cam disk.

Fig. 10 shows the oscillating member which carries the pawls by which the ratchet device and the cam disk are turned.

Fig. 11 is a perspective of the frame in which these operating parts are secured.

Fig. 12 shows one of the screen members separate from the other parts.

Figure 5:
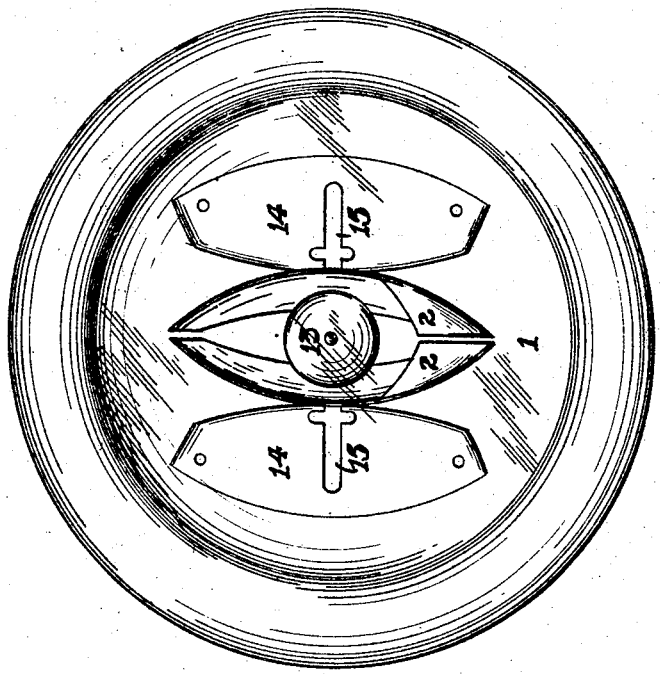
Figs. 5 and 6 are front views of the device showing in the one case the screen members thrown forwardly and in the other case thrown outwardly.
Figure 6:
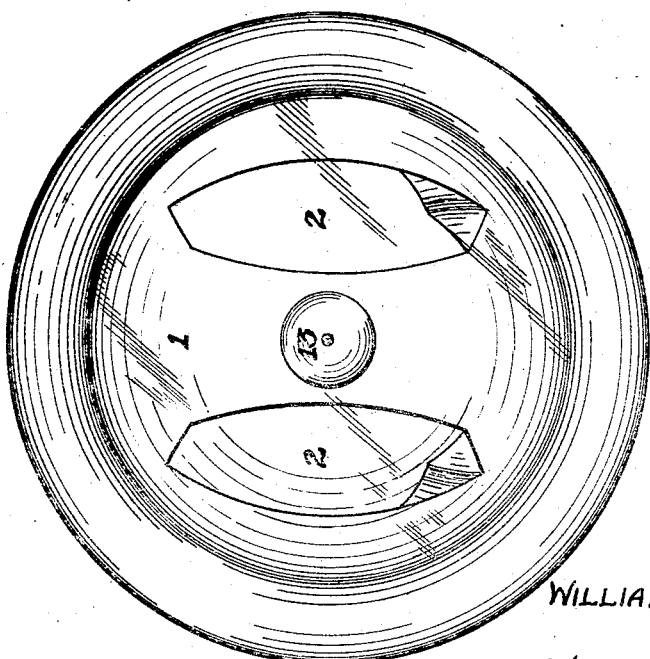

In the drawings 1 represents the reflector member and 10 an outer casing, the two being of such respective size as to leave a considerable chamber between them. The front of the reflector and also the casing, is closed by means of a door 11 which holds the lens or glass plate 12 to cover the open front of the reflector. These features of construction are common to a great variety of headlights. The electric light 13 is placed centrally toward the back part of the reflector after the usual practice.

Two screen members 2 are placed within the reflector, these being of such shape that when they are in their open position they form substantially a continuation of and form a section of the reflecting surface of the reflector. They are shown in this position in Fig. 1. These screen members are hinged at 20, the arm 21 passing through slots 15 formed in the wall of the reflector, and the pivot 20 being to the rear side of the reflector. The reflector itself is preferably provided with a slight recess 14 of a size and shape to receive the body of the screen members 2 when the latter are swung outwardly. In this case the inner contour of the reflector is maintained true and regular when the screen members are swung outward and back, as their outer surfaces substantially conform to the contour of the reflector.

Extending rearwardly from the pivot 20 of the screen member, are two arms 22 and 23. One of these, as the arm 23, is rigid with the arm 21, while the other arm 22 is a separate member, being pivoted upon the arm 21 and held toward the arm 23 by means of a spring 24, thereby securing a measure of yielding as between the two arms, in order to accommodate the action of the cam flange.

Mounted upon a fixed sleeve 16 through which the connections with the lamp 13 are passed, is a disk 3 which has thereon a cam flange 30. This cam flange has a number of lobes therein and extends between the two arms 22 and 23 of the screen members. If the disk 3 be given a step-by-step rotation or forward turning movement, the arms 22 and 23 will be caused to engage the part of the flange, successively toward the outer and toward the inner lobes thereof, thereby swinging the screen member between closed and opened position. It is, therefore, only necessary to provide means for giving this disk 3 a suitable step-by-step forward movement.

Secured to the disk 3 is a sleeve 4 which has thereon a flange having a series of teeth 40 forming a ratchet wheel. Mounted to oscillate upon the sleeve 4 is a ring-like member 5 which has short arms 50 upon which are mounted pawls 51, these being positioned to engage with the teeth 40 of the ratchet wheel. Springs 52 return this ring to its normal position after it has been actuated by the mechanism to be described for operating the device.

The number of teeth in the ratchet wheel corresponds with the total number of inner and outer lobes in the cam ring 30. As herein shown, this amounts to eight, giving eight different positions for the screen members caused by one complete rotation of the disk 3, four of these being outward positions or that in which the screen members conform to the curvature of the reflector, as shown in Fig. 1, and the other that in which they are swung forward to screen the light, as shown in Fig. 2.

These mechanisms are supported upon a plate 6 and brackets 60 complemental thereto, which are shown in perspective in Fig. 11. These parts have arms 61 and 62, which are secured to the rear surface of the reflector 1. Also secured to the rear surface of the reflector are two solenoids 7, these constituting the means by which the mechanism is actuated. These solenoids have their cores 70 projecting, each being secured to a bell crank lever 71, of which the other end engages a pin 72 carried by the oscillating ring 5 which pin is the pivot pin for a pawl, 51. The springs 52, by which the ring 5 is returned to its normal position, acts also to pull outwardly the cores 70 of the solenoid. While I have shown two solenoids, it is evident that one, if of sufficient power, will suffice.

When the current is turned on to the solenoid coil, the core 70 is drawn inwardly, thus oscillating the ring 5 and advancing the cam disk 3 sufficient to cause a movement of the disk so as to shift its engagement with the arms 22 and 23 from an outer to an inner part of a lobe of the cam flange, or vice-versa, depending upon which was before in engagement therewith. In other words, if an outer portion of a lobe of the cam flange 30 is in engagement with the levers 22 and 23, the disk will be turned so as to engage the same with the inner portion of a lobe of the cam flange. In this way a solenoid is capable of being used for shifting the screen members from either position into the other. The button or switch by which the current of the solenoid is controlled may be located at any convenient point.

The operation of the device is evident. If the screen is in the outer position, or as shown in Fig. 1, energizing of the solenoids cause them to swing the screen members into the inner position, or that shown in Fig. 2, in which position they remain until the solenoid has been again energized. When this happens they are swung to the outer position where they remain until the solenoids again act.

A pawl 8 is mounted upon the plate 6 and drops into recesses 41 which are formed in the body of the sleeve 4 upon which the ratchet teeth 40 are placed. This pawl serves to prevent accidental movement of the parts. It is engaged by a pin 81 on one of the pawls 51 to lift it out of its notch and thus free the sleeve 4 of the beginning of the forward movement of the ring 5. To secure this result the pawl 51 is so mounted and actuated that it moves a certain distance before it engages its ratchet 40 and during the first part of its travel it engages the end 80 of the pawl 8 to throw this end inward and thus move outward the locking end of the pawl before the pawl strikes the ratchet teeth 40.

What I claim as my invention is:

1. The combination with a headlight of a pair of screens pivoted at opposite sides of the light to swing toward and from each other and having operating arms extending rearwardly of their pivots, of a cam member engaging said arms, a ratchet wheel secured to said cam member, reciprocatively mounted pawls for turning said wheel and solenoids connected with and actuating said pawls.

2. The combination with pivoted light screens each having a pair of operating arms projecting from their pivot, a rotative disk having a cam flange projecting from its face and entering between the pairs of arms, a ratchet wheel secured to the cam disk, an oscillating member carrying driving pawls, and a solenoid having its core actuatively connected with said oscillating member.

Signed at Seattle, Washington, this 20th day of December, 1917.

WILLIAM A. SCHROEDER.

Copies of this patent may be obtained for five cents each, by addressing the "Commissioner of Patents, Washington, D. C."